United States Patent
Radion et al.

(10) Patent No.: US 10,518,682 B1
(45) Date of Patent: Dec. 31, 2019

(54) LATERAL HEAD SUPPORT FOR A VEHICLE PASSENGER SEAT

(71) Applicant: GM GLOBAL TECHNOLOGY OPERATIONS LLC, Detroit, MI (US)

(72) Inventors: Stephanie C. Radion, Bloomfield Hills, MI (US); Daniel W. Booth, Troy, MI (US); Stephen Rylance, Holly, MI (US); Daniel Arico, New Baltimore, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 16/122,936

(22) Filed: Sep. 6, 2018

(51) Int. Cl.
*B60N 2/832* (2018.01)
*B60N 2/835* (2018.01)
*B60N 2/885* (2018.01)
*B60R 22/30* (2006.01)

(52) U.S. Cl.
CPC ............. *B60N 2/885* (2018.02); *B60R 22/30* (2013.01)

(58) Field of Classification Search
CPC ................................ B60N 2/885; B60R 22/30
USPC ........ 297/391–410, 464, 484, 486, 487, 488
See application file for complete search history.

(56) References Cited

U.S. PATENT DOCUMENTS

| | | | | | |
|---|---|---|---|---|---|
| 3,887,233 A | * | 6/1975 | Garavaglia | ............. | B60R 22/26 297/478 |
| 5,370,446 A | * | 12/1994 | Bancod | .................... | A47C 7/38 297/408 |
| 5,411,468 A | * | 5/1995 | Chen | ...................... | B60N 2/885 297/391 X |
| 5,531,505 A | * | 7/1996 | Baetz | ..................... | B60N 2/847 297/464 X |
| 5,586,810 A | * | 12/1996 | Liu | .......................... | A47C 7/38 297/406 |
| 5,904,405 A | * | 5/1999 | Wu | ........................ | B60N 2/885 297/464 X |
| 6,045,183 A | * | 4/2000 | Weber | .................. | B60N 2/2839 297/487 X |
| 6,120,099 A | * | 9/2000 | Reikerås | ................ | B60N 2/809 297/391 |
| 6,250,716 B1 | * | 6/2001 | Clough | .................. | A47C 7/383 297/391 X |
| 6,616,235 B1 | * | 9/2003 | Khavari | ................. | B60N 2/847 297/408 |
| 8,684,414 B1 | * | 4/2014 | McBride | ................. | B60R 22/02 280/801.1 |
| 8,985,622 B1 | * | 3/2015 | Cannon | ................. | B60R 21/231 297/391 X |
| 9,078,525 B2 | * | 7/2015 | O'Sullivan | ............ | A47C 7/383 |

(Continued)

FOREIGN PATENT DOCUMENTS

| | | | | |
|---|---|---|---|---|
| DE | 19653516 A1 * | 6/1997 | ............. | B60N 2/809 |
| DE | 10349929 A1 * | 7/2004 | ............. | B60N 2/838 |

(Continued)

*Primary Examiner* — Rodney B White

(57) ABSTRACT

A passenger seat for a vehicle includes a head restraint positioned at an upper portion of the passenger seat and a lateral head support selectively configurable between a deployed configuration in which the lateral head support provides lateral support for at least one side of a passenger head and a stowed configuration in which the lateral support collapses into the passenger seat such that the lateral head support no longer provides lateral support for a passenger head.

18 Claims, 4 Drawing Sheets

(56) References Cited

U.S. PATENT DOCUMENTS

| | | | | |
|---|---|---|---|---|
| 9,216,676 | B1* | 12/2015 | Reyes Luna | B60N 2/986 |
| 9,446,694 | B2* | 9/2016 | Szczygiel | B60N 2/885 |
| 9,481,277 | B1* | 11/2016 | Ruelas | B60N 2/885 |
| 10,399,475 | B2* | 9/2019 | Jalpa | B60N 2/838 |
| 2001/0040401 | A1* | 11/2001 | Lin | B60N 2/885 297/397 |
| 2002/0033628 | A1* | 3/2002 | Clough | B60N 2/885 297/410 |
| 2002/0158499 | A1* | 10/2002 | Clough | B60N 2/885 297/410 |
| 2004/0169411 | A1* | 9/2004 | Murray | B60R 22/105 297/486 |
| 2005/0127740 | A1* | 6/2005 | Dowty | B64D 11/06 297/397 X |
| 2013/0181496 | A1* | 7/2013 | Nawaz | B60N 2/806 297/391 X |
| 2015/0197170 | A1* | 7/2015 | Obukhov | B60R 21/207 297/391 |
| 2016/0100250 | A1* | 4/2016 | Baskin | H04R 1/02 297/217.4 |

FOREIGN PATENT DOCUMENTS

| | | | | |
|---|---|---|---|---|
| DE | 102004049300 | A1 * | 4/2006 | B60R 21/04 |
| DE | 102007041034 | A1 * | 3/2009 | B60N 2/885 |
| DE | 102014206145 | A1 * | 10/2015 | B60N 2/885 |
| DE | 102014219867 | A1 * | 3/2016 | B60N 2/838 |
| EP | 1356987 | A2 * | 10/2003 | B60N 2/885 |
| FR | 2806983 | A1 * | 10/2001 | B60N 2/838 |
| FR | 2812594 | A1 * | 2/2002 | B60N 2/838 |
| JP | H0638703 | U * | 5/1994 | B60N 2/885 |
| JP | 2004161213 | A * | 6/2004 | B60N 2/882 |
| JP | 2010099411 | A * | 5/2010 | B60N 2/976 |
| WO | WO-2017020877 | A1 * | 2/2017 | B60N 2/874 |
| WO | WO-2017118868 | A1 * | 7/2017 | A47C 7/38 |

* cited by examiner

LATERAL HEAD SUPPORT FOR A VEHICLE PASSENGER SEAT

FIELD

The present disclosure relates to a lateral head support for a vehicle passenger seat. In particular, the present disclosure relates to a lateral head support for a vehicle passenger seat which may be selectively configured into a stowed configuration in which the head support does not affect or otherwise interact with a passenger occupying the seat and a deployed configuration in which the head support provides comfortable later support for the head of a passenger occupying the seat.

INTRODUCTION

This introduction generally presents the context of the disclosure. Work of the presently named inventors, to the extent it is described in this introduction, as well as aspects of the description that may not otherwise qualify as prior art at the time of filing, are neither expressly nor impliedly admitted as prior art against this disclosure.

Automotive vehicles include passenger seats which do not include an integrated means of laterally supporting the head of a passenger for comfort. Therefore, a passenger who is interested in having a comfortable lateral head support is required to separately provide and install a lateral head support. Once installed into a passenger seat, these lateral head supports may be undesirable to a passenger who does not want a lateral head support. A comfortable lateral head support is needed which is fully integrated into the passenger vehicle seat and which is easily deployable by a passenger desiring to use the support and which is also stowable out of the way for a passenger who does not want to use a lateral head support.

SUMMARY

In an exemplary aspect, a passenger seat for a vehicle includes an upper portion of a seat back of the passenger seat and a lateral head support selectively configurable between a deployed configuration in which the lateral head support provides lateral support for at least one side of a passenger head and a stowed configuration in which the lateral head support collapses into the passenger seat such that the lateral head support no longer provides lateral support for a passenger head.

In this manner, a comfortable lateral head support may be deployed by a passenger to provide comfortable lateral head support when desired while also providing the ability to stow the lateral head support out of the way of the passenger when a comfortable lateral head support is not desired.

In another exemplary aspect, the upper portion of a seat back includes a head restraint.

In another exemplary aspect, the seat further includes a shoulder harness and the lateral head support is attached to one of the shoulder harness and the upper portion of the seat back and the lateral head support is selectively fastenable to the other of the shoulder harness and the upper portion of the seat back.

In another exemplary aspect, the lateral head support includes a hook shaped fastener for selectively fastening to the other of the shoulder harness and the upper portion of the seat back.

In another exemplary aspect, the lateral head support includes a flexible fabric.

In another exemplary aspect, the seat further includes a flexible rod attached at a distal end to an edge of the flexible fabric and at a proximal end to one of the shoulder harness and the upper portion of the seat back.

In another exemplary aspect, the flexible fabric includes a top section that connects between two opposing sides of the lateral head support.

In another exemplary aspect, the lateral head support further includes a rope-like support connected to the flexible fabric.

In another exemplary aspect, the rope-like support is adjustable in length to adapt the shape of the flexible fabric to a passenger head.

In another exemplary aspect, the lateral head support further includes a retractable support arm that is attached to an edge of the flexible fabric and the upper portion of the seat back includes a winding mechanism operable to selectively extend the support arm from the upper portion of the seat back and to retract the support arm into the upper portion of the seat back.

In another exemplary aspect, the lateral head support is attached to the upper portion of the seat back and includes a fan folded fabric.

In another exemplary aspect, the head restraint includes a first engagement member on an upper portion of the upper portion of the seat back and a second engagement member on a lower portion of the upper portion of the seat back.

In another exemplary aspect, the lateral head support further includes a fastener which is selectively engageable with the first engagement member to place the lateral head support in a deployed configuration and a second engagement member to place the lateral head support in a stowed configuration.

In another exemplary aspect, the lateral head support includes an outer facing panel that is connected to a surface of the upper portion of the seat back by at least one flexible rib.

In another exemplary aspect, the lateral head support further includes a fastener on the outer facing panel, a first set of connectors on a surface of the upper portion of the seat back adapted to engage the fastener in a deployed configuration in which the outer facing panel is spaced away from the surface of the upper portion of the seat back, and a second set of connectors on the surface of the upper portion of the seat back adapted to engage the fastener in a stowed configuration in which the outer facing panel is spaced closer to the surface of the upper portion of the seat back than in the deployed configuration.

In another exemplary aspect, the lateral head support includes a bi-stable flexible rod that is stable in both a deployed configuration in which the bi-stable flexible rod is positioned forward of the upper portion of the seat back of the seat and in an intermediate configuration in which the bi-stable flexible rod is positioned to the rear of the upper portion of the seat back.

In another exemplary aspect, the lateral head support further includes a support post fastener that connects the bi-stable flexible rod to a head restraint support post in the upper portion of the seat back.

In another exemplary aspect, the lateral head support further includes a flexible fabric extending between extended portions of the bi-stable flexible rod.

In another exemplary aspect, the lateral head support further includes a plurality of clip fasteners on a rear facing surface of the upper portion of the seat back which are each adapted to engage with the bi-stable flexible rod in the stowed configuration.

Further areas of applicability of the present disclosure will become apparent from the detailed description provided below. It should be understood that the detailed description and specific examples are intended for purposes of illustration only and are not intended to limit the scope of the disclosure.

The above features and advantages, and other features and advantages, of the present invention are readily apparent from the detailed description, including the claims, and exemplary embodiments when taken in connection with the accompanying drawings.

BRIEF DESCRIPTION OF THE DRAWINGS

The present disclosure will become more fully understood from the detailed description and the accompanying drawings, wherein.

DETAILED DESCRIPTION

Figure 3:
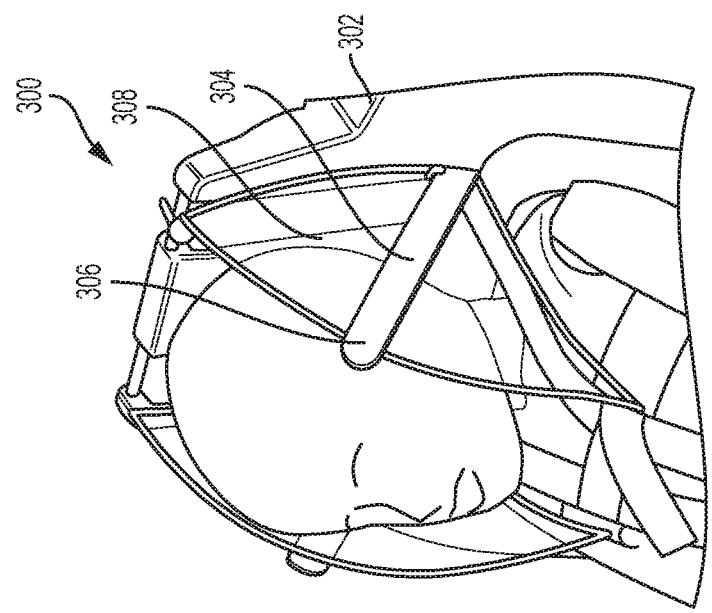
FIG. 3 is a perspective view of another exemplary embodiment of a lateral head support for a passenger vehicle seat in a deployed configuration.

Reference will now be made in detail to several examples of the disclosure that are illustrated in accompanying drawings. Whenever possible, the same or similar reference numerals are used in the drawings and the description to refer to the same or like parts or steps. The drawings are in simplified form and are not to precise scale. For purposes of convenience and clarity only, directional terms such as top, bottom, left, right, up, over, above, below, beneath, rear, and front, may be used with respect to the drawings. These and similar directional terms are not to be construed to limit the scope of the disclosure in any manner. Referring now to the drawings, wherein like reference numbers correspond to like or similar components throughout the several figures.

Figure 1:
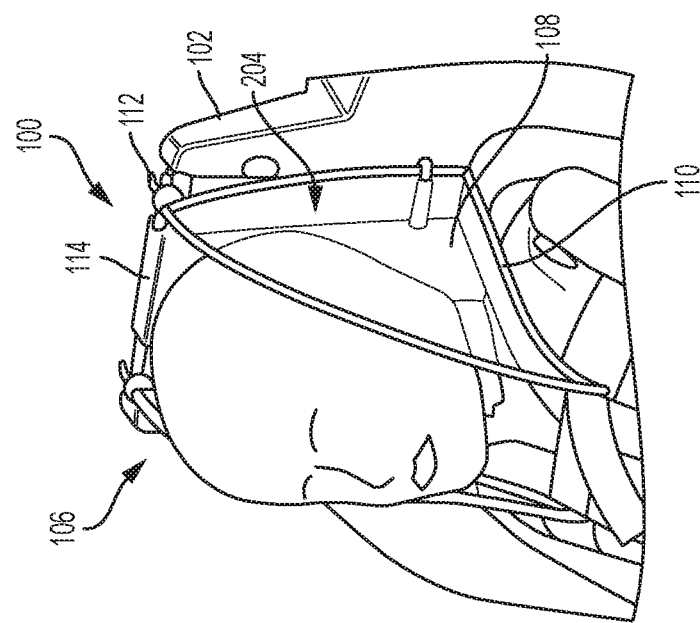
FIG. 1 is a perspective view of an exemplary embodiment of a lateral head support for a passenger vehicle seat in a deployed configuration.

FIG. 1 is a perspective view of an exemplary embodiment of a lateral head support 100 for a passenger vehicle seat 102 in a deployed configuration. The lateral head support 100 includes a first side 104 and a second side 106, each of which are substantially configured in the same manner. The first side 104 of the lateral head support 100 includes a flexible fabric 108 that is proximally attached on one edge to a shoulder harness 110 and includes a fastener 112 on a distal extent of the fabric 108. In the deployed configuration that is illustrated in FIG. 1, the fastener 112 is fastened to an upper portion of a head restraint 114 of the passenger vehicle seat 102. In the exemplary embodiment illustrated in FIG. 1, the fastener 112 has a hook shape which hooks around a small bar in the upper portion of the head restraint 114. It is to be understood that the fastener 114 and the means with which it fastens to the head restraint 114 is not limited to any particular form of fastener.

In this deployed configuration the flexible fabric 108 extends from the shoulder harness 110 to the upper portion of the head restraint 114 to thereby form a comfortable lateral head support for a head of a passenger sitting in the passenger seat 102. In a preferred embodiment, the fabric 108 is flexible and stretchable such that it provides a soft comfortable surface against which a passenger may rest their head and be laterally supported by the fabric 108.

Figure 2:
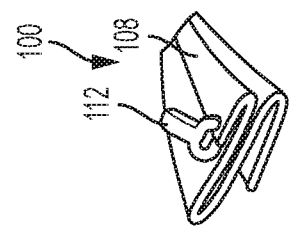
FIG. 2 is a close-up perspective view of the lateral head support of FIG. 1 in a stowed configuration.

FIG. 2 provides a close-up perspective view of the lateral head support 100 of FIG. 1 in a stowed configuration. When the fastener 114 is unfastened from the head restraint 114, the fabric 108 may elastically retract and fold up neatly onto the shoulder harness 110. In an optional aspect, a small ring (not shown) may be attached to the shoulder harness 110 and the fastener 112 may fasten to the small ring to maintain the lateral head support 100 in the stowed configuration.

Optionally, rather than being attached to the shoulder harness 110 on one edge of the fabric 108, an alternative embodiment of the lateral head support (not shown) may have one edge of the fabric 108 attached to the head restraint 114 and, instead of fastening the fastener 112 to the head restraint 114 to deploy the lateral head support 100, the fastener 112 may be fastened to the shoulder harness 110 to deploy the lateral head support 100. In order then to stow the lateral head support 100, the fastener 112 may be fastened to an upper portion of the head restraint 114. In other words, the direction of deployment and stowing that is illustrated in FIG. 1 may be reversed and remain within the scope of the present invention.

FIG. 3 provides a perspective view of another exemplary embodiment of a lateral head support 300 for a passenger vehicle seat 302 in a deployed configuration. The lateral head support 300 is substantially the same as that illustrated in FIGS. 1 and 2, however, the lateral head support 300 includes a flexible rod 304. The flexible rod 304 is attached at a distal end 306 to an edge of the fabric 308 and at a proximal end to one of the shoulder harness or head restraint. The flexible rod 304 is substantially rigid in the axial direction such that it serves to increase the surface area of the fabric 308 in the deployed condition and, thereby, improve the ability of the lateral head support 300 to comfortably support the head of a passenger in the vehicle seat 302. The flexible rod 304 is flexible enough in the non-axial direction such that it easily conforms to the contour of either the shoulder harness or the head restraint when the lateral head support 300 is in the stowed configuration.

Figure 4:
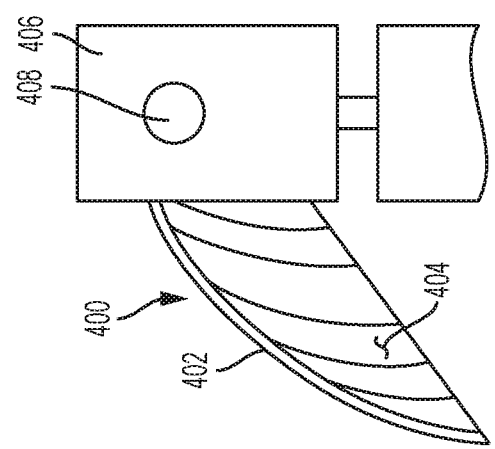
FIG. 4 is a schematic elevation view of another exemplary embodiment of a lateral head support for a passenger vehicle seat in a deployed configuration.

FIG. 4 is a schematic elevation view of another exemplary embodiment of a lateral head support 400 for a passenger vehicle seat in a deployed configuration. The head support 400 includes an extendable and retractable support arm 402 that is attached to an edge of a flexible fabric 404 is attached at an edge adjacent the head restraint 406 of a passenger vehicle seat. The support arm 402 extends into the head restraint 406 and engages a winding mechanism (not shown) that is embedded within the head restraint 406. The winding mechanism may be operated manually by rotating a knob 408 that is positioned on a side external surface of the head restraint 406 where it may be easily accessed and operated by a passenger. In this manner, the head support 400 may selectively be stowed away in the head restraint 406 by rotating the knob 408 in a direction which operates the winding mechanism to retract the support arm 402 into the head restraint 406 or the head support 400 may be deployed by rotating the knob 408 in the opposite direction to extend the support harm 402 from the head restraint 406. Alternatively, the winding mechanism may be spring loaded so as to automatically retract and/or motorized and still form an exemplary embodiment of the present invention, without limitation.

Figure 5:
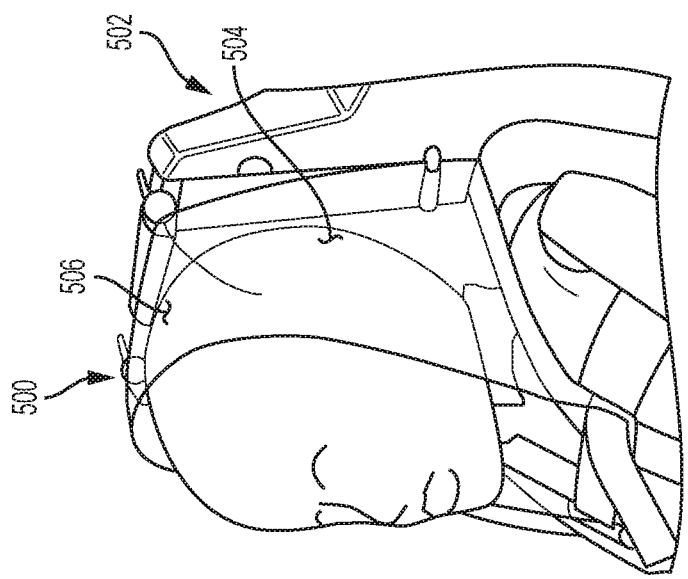
FIG. 5 is a perspective view of another exemplary embodiment of a lateral head support for a passenger vehicle seat in a deployed configuration.

FIG. 5 is a perspective view of another exemplary embodiment of a lateral head support 500 for a passenger vehicle seat 502 in a deployed configuration. The lateral head support 500 is similar to the embodiment described earlier with reference to FIG. 1, however, the flexible fabric 504 of the head support 500 includes a top section 506 which may connect both sides of the support 500. In this manner, the head support 500 provides a hood shape which may improve the level of lateral support for the head of a passenger and thereby improve the comfort level of the passenger.

Figure 6:
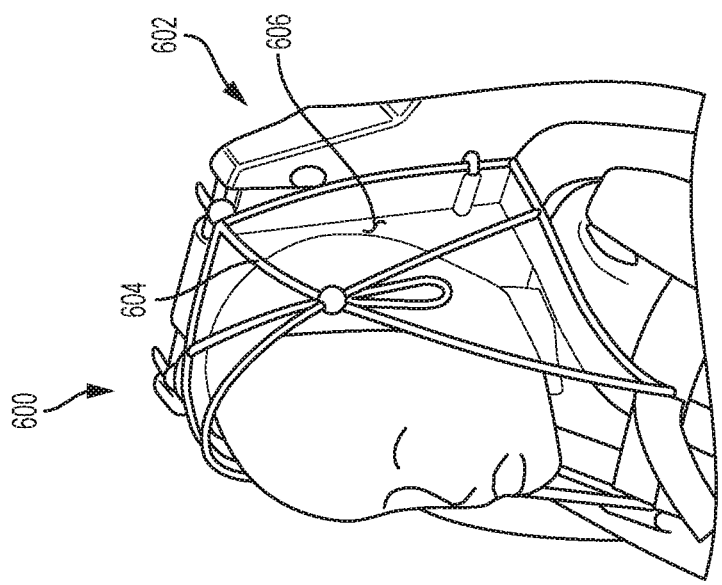
FIG. 6 is a perspective view of another exemplary embodiment of a lateral head support for a passenger vehicle seat in a deployed configuration.

FIG. 6 is a perspective view of another exemplary embodiment of a lateral head support 600 for a passenger vehicle seat 602 in a deployed configuration. The head support 600 is similar to the head support 500 described with reference to FIG. 5, however, the head support 600 includes one or more flexible rope-like supports 604. Each of the rope-like supports 604 may be attached to the flexible fabric 606 in a manner which adapts the shape of the flexible fabric 606 to more comfortably conform to the head of a passenger and, thereby, improve the comfort level of the passenger. Additionally, one or more of the rope-like supports 604 may be adjustable in length to adapt the overall size of the shape of the flexible fabric 606 to the size and shape of a passenger which further improves the ability of the head support 600 to laterally support the head of the passenger and to further improve the comfort of the passenger.

Figure 7:
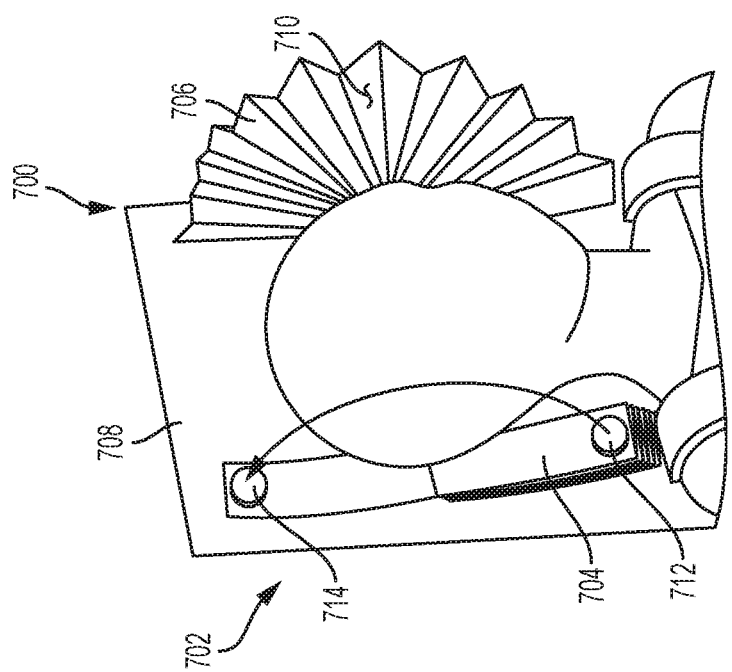
FIG. 7 is a perspective view of another exemplary embodiment of a lateral head support for a passenger vehicle seat.

FIG. 7 is a perspective view of another exemplary embodiment of a lateral head support 700 for a passenger vehicle seat 702. The lateral head support 700 includes two sides, one each for a side of a passenger head. FIG. 7 illustrates a first side 704 of the head support 700 in a stowed configuration and a second side 704 in a deployed configuration. Both sides 704 and 706 are attached to a head restraint 708 of the seat 702. Each side of the head support 700 includes a fan folded fabric 710 which, when in the deployed configuration, comfortably provides lateral support for the head of a passenger and, when in the stowed configuration, folds up neatly against the head restraint 708. Each side of the head support 700 may include a fastener 712 which may selectively engage a first engagement member 714 on an upper portion of the head restraint 708 and/or a second engagement member (not shown) on a lower portion of the head restraint 708. In this manner, a passenger may selectively deploy or stow each side of the head support 700 by either engaging the fastener 712 with the first engagement member 714 to place the respective side in a deployed configuration or by engaging the fastener 712 with the second engagement member to place the respective side in a stowed configuration.

Figure 9:
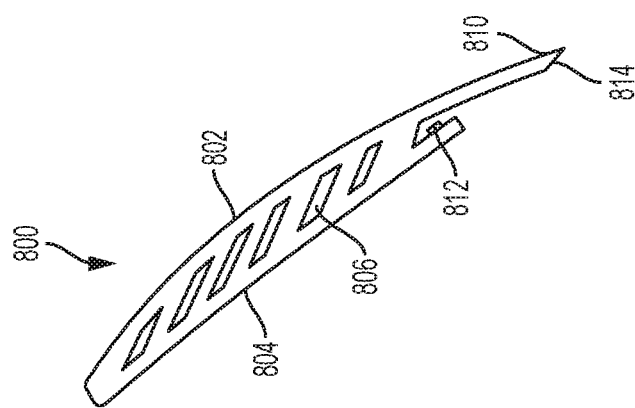
FIG. 9 is a side elevation view of the lateral head support of FIG. 8 in a stowed configuration.
Figure 8:
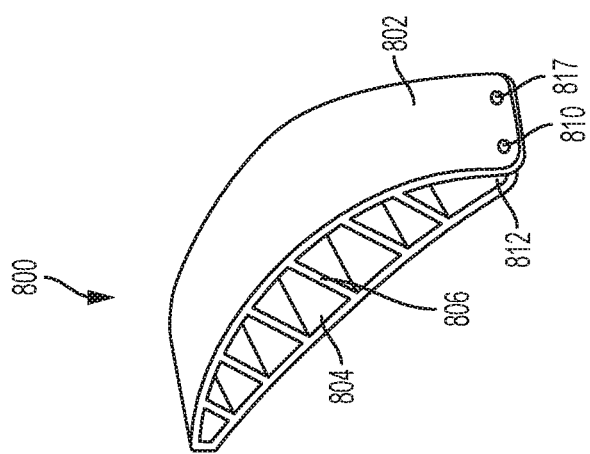
FIG. 8 is a perspective view of another exemplary embodiment of a lateral head support for a passenger vehicle seat in a deployed configuration.

FIG. 8 is a perspective view of another exemplary embodiment of a lateral head support 800 for a passenger vehicle seat in a deployed configuration and FIG. 9 is a side elevation view of the lateral head support 800 in a stowed configuration. The head support 800 may include an outer facing panel 802 which is connected to a surface 804 of a head restraint by one or more flexible ribs 806. An end 808 of the outer facing panel 802 may include one or more fasteners 810 which may selectively engage a first set of connectors 812 or a second set of connectors 814 which are each positioned on the surface 804 of the head restraint. In this manner, a passenger may selectively deploy or stow the head support 800 by engaging the fasteners 810 with the first set of connectors 812 to deploy the head support 800 (as illustrated in FIG. 8) or by engaging the fasteners 810 with the second set of connectors 814 to stow the head support 800 (as illustrated in FIG. 9).

Figure 11:
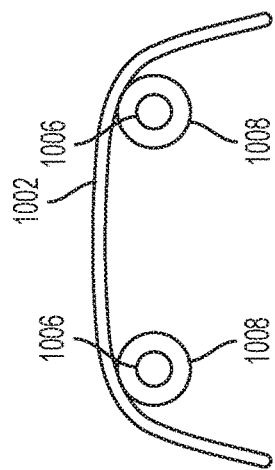
FIG. 11 is a cross-sectional plan view of the lateral head support of FIG. 10.
Figure 10:
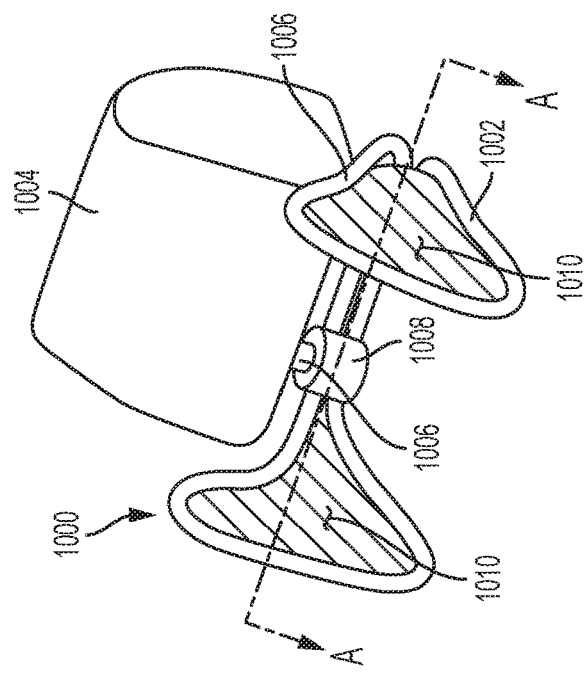
FIG. 10 is a perspective view of another exemplary embodiment of a lateral head support for a passenger vehicle seat in a deployed configuration.

FIG. 10 is a perspective view of another exemplary embodiment of a lateral head support 1000 for a passenger vehicle seat in a deployed configuration. FIG. 11 is a cross-sectional plan view of the lateral head support along a cross-sectional plane A of FIG. 10. The head support 1000 includes a flexible rod 1002 which is bi-stable in either a deployed configuration as illustrated in FIG. 10 or in a rearward position relative to the head restraint 1004 of the seat. The head support 1000 may be attached to head restraint support posts 1006 by support post fasteners 1008. A flexible fabric 1010 may be provided which flexibly extends between portions of the flexible rod 1002 that extend away from the head restraint 1004. In the deployed configuration illustrated in FIG. 10, the flexible rod 1002 and the flexible fabric 1010 provide comfortable lateral support for a head of a passenger.

Figure 12:
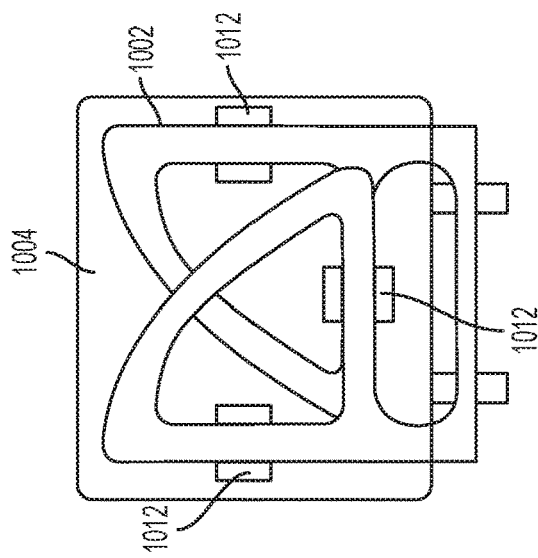
FIG. 12 is a rear elevation view of the lateral head support of FIG. 10 in a stowed configuration.

The flexible rod 1002 of the head support 1000 is also stable in a configuration where the flexible rod 1002 extends to the rear of the head support 1000 (not illustrated). This is an intermediate configuration between the deployed configuration of FIG. 10 and the stowed configuration which is illustrated in FIG. 12. FIG. 12 is a rear elevation view of the lateral head support 1000 in the stowed configuration. The flexible rod 1002 engages with clip fasteners 1012 which are positioned on the rear of the head restraint 1004. In this manner, a passenger may selectively transition the head support 1000 from the stowed configuration to a deployed configuration by releasing the flexible rod 1002 from the clip fasteners 1012 and moving the flexible rod 1002 from the stable rearward orientation to the stable forward orientation. A passenger may transition the head support 1000 from the deployed configuration to the stowed configuration merely by reversing this process.

It is to be understood that present invention is not limited to any particular configuration of passenger seat which may or may not include a head restraint that is integrated into an upper portion of the seat back of the passenger seat. It is also to be understood that while the illustrations in FIGS. 7-9 illustrate embodiments which are connected to a head restraint, that the present invention is not so limited. Rather, the exemplary embodiments of FIGS. 7-9 may also be modified to be connected to, for example, a shoulder harness in a manner similar to that described previously or other connection to the passenger vehicle seat and/or the upper portion of the seat back which may or may not include a head restraint, without limitation. For example, the passenger seat may include a head restraint, but the head support may be connected to the upper portion of the seat back rather than the head restraint.

This description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A passenger seat for a vehicle comprising:
an upper portion of a seat back of the passenger seat; and
a lateral head support selectively configurable between a deployed configuration in which the lateral head support provides lateral support for at least one side of a passenger head and a stowed configuration in which the lateral support collapses into the passenger seat such that the lateral head support no longer provides lateral support for a passenger head, wherein the lateral head support comprises a flexible fabric.

2. The passenger seat of claim 1, wherein the upper portion of the seat back comprises a head restraint.

3. The seat of claim 1, further comprising a shoulder harness and wherein the lateral head support is attached to one of the shoulder harness and the upper portion of the seat back and wherein the lateral head support is selectively fastenable to the other of the shoulder harness and the upper portion of the seat back.

4. The seat of claim 3, wherein the lateral head support comprises a hook shaped fastener for selectively fastening to the other of the shoulder harness and the upper portion of the seat back.

5. The seat of claim 1, further comprising a flexible rod attached at a distal end to an edge of the flexible fabric and at a proximal end to one of the shoulder harness and the upper portion of the seat back.

6. The seat of claim 1, wherein the flexible fabric includes a top section that connects between two opposing sides of the lateral head support.

7. The seat of claim 1, the lateral head support further comprises a rope-like support connected to the flexible fabric.

8. The seat of claim 7, wherein the rope-like support is adjustable in length to adapt the shape of the flexible fabric to a passenger head.

9. The seat of claim 1, wherein the lateral head support further comprises a retractable support arm that is attached to an edge of the flexible fabric and wherein the upper portion of the seat back comprises a winding mechanism operable to selectively extend the support arm from the upper portion of the seat back and to retract the support arm into the upper portion of the seat back.

10. A passenger seat for a vehicle comprising:
an upper portion of a seat back of the passenger seat; and
a lateral head support selectively configurable between a deployed configuration in which the lateral head support provides lateral support for at least one side of a passenger head and a stowed configuration in which the lateral support collapses into the passenger seat such that the lateral head support no longer provides lateral support for a passenger head, wherein the lateral head support is attached to the upper portion of the seat back and comprises a fan folded fabric.

11. The seat of claim 1, wherein the head restraint comprises a first engagement member on an upper portion of the upper portion of the seat back and a second engagement member on a lower portion of the upper portion of the seat back.

12. The seat of claim 11, wherein the lateral head support further comprises a fastener which is selectively engageable with the first engagement member to place the lateral head support in a deployed configuration and a second engagement member to place the lateral head support in a stowed configuration.

13. A passenger seat for a vehicle comprising:
an upper portion of a seat back of the passenger seat; and
a lateral head support selectively configurable between a deployed configuration in which the lateral head support provides lateral support for at least one side of a passenger head and a stowed configuration in which the lateral support collapses into the passenger seat such that the lateral head support no longer provides lateral support for a passenger head, wherein the lateral head support comprises an outer facing panel that is connected to a surface of the upper portion of the seat back by at least one flexible rib.

14. The seat of claim 13, wherein the lateral head support further comprises:
a fastener on the outer facing panel;
a first set of connectors on a surface of the upper portion of the seat back adapted to engage the fastener in a deployed configuration in which the outer facing panel is spaced away from the surface of the upper portion of the seat back; and
a second set of connectors on the surface of the head restraint adapted to engage the fastener in a stowed configuration in which the outer facing panel is spaced closer to the surface of the upper portion of the seat back than in the deployed configuration.

15. The seat of claim 1, wherein the lateral head support comprises a bi-stable flexible rod that is stable in both a deployed configuration in which the bi-stable flexible rod is positioned forward of the upper portion of the seat back of the seat and in an intermediate configuration in which the bi-stable flexible rod is positioned to the rear of the upper portion of the seat back.

16. The seat of claim 15, wherein the lateral head support further comprises a support post fastener that connects the bi-stable flexible rod to a head restraint support post of the upper portion of the seat back.

17. The seat of claim 15, wherein the flexible fabric extends between extended portions of the bi-stable flexible rod.

18. The seat of claim 15, wherein the lateral head support further comprises a plurality of clip fasteners on a rear facing surface of the upper portion of the seat back which are each adapted to engage with the bi-stable flexible rod in the stowed configuration.

* * * * *